United States Patent
Beaman

(10) Patent No.: US 6,186,668 B1
(45) Date of Patent: Feb. 13, 2001

(54) BEARING ASSEMBLY

(75) Inventor: Michael D. Beaman, Torrington, CT (US)

(73) Assignee: The Torrington Company, Torrington, CT (US)

(*) Notice: Under 35 U.S.C. 154(b), the term of this patent shall be extended for 0 days.

(21) Appl. No.: 09/246,287

(22) Filed: Feb. 8, 1999

(51) Int. Cl.$^7$ ................................................. F16C 27/06
(52) U.S. Cl. ............................................. 384/486; 384/582
(58) Field of Search ................................ 384/486, 582, 384/558, 570, 495; 74/492

(56) References Cited

U.S. PATENT DOCUMENTS

| | | |
|---|---|---|
| 2,007,152 | 7/1935 | Allee . |
| 3,883,194 * | 5/1975 | Pitner .................................... 384/582 |
| 3,890,854 * | 6/1975 | Pitner ...................................... 74/492 |
| 3,918,776 * | 11/1975 | Zimmer et al. ....................... 384/558 |
| 4,185,880 * | 1/1980 | Shiomi et al. ....................... 74/492 X |
| 4,249,782 | 2/1981 | Frank . |
| 4,403,812 * | 9/1983 | Stephan ................................ 384/536 |
| 4,708,498 | 11/1987 | Ladedan et al. . |
| 4,820,062 | 4/1989 | Shirane . |
| 5,048,980 | 9/1991 | Dickinson . |
| 5,468,074 * | 11/1995 | Godec et al. ........................ 384/495 |
| 5,632,562 | 5/1997 | Kidzun et al. . |

* cited by examiner

Primary Examiner—Richard M. Lorence
(74) Attorney, Agent, or Firm—John C. Bigler

(57) ABSTRACT

A plurality of rolling elements is in rolling contact with a metal outer race and is retained within a bearing cage. An annular bushing partially encloses the outer race, the annular bushing being split along a radial plane into two bushing halves molded of an engineered thermoplastic elastomer. The bushing halves are retained axially together such that axial movement of the outer race is limited. The annular bushing may incorporate integral annular seals and may have a rounded radially outward surface to facilitate self-alignment of the bearing assembly.

12 Claims, 3 Drawing Sheets

BEARING ASSEMBLY

BACKGROUND OF THE INVENTION

This invention relates generally to bearing assemblies having a flexible annular bushing and, more particularly, to a bearing assembly suitable for the mounting of steering columns and similar applications.

In such applications, a bearing assembly is required that isolates a shaft, for example a steering column, with respect to noise and vibration. In addition, a "zero clearance" bearing may be desired in those applications to further improve noise and vibration characteristics and maintain a "tight" feel. A needle bearing, for example, may have a split outer race and split bearing cage forced against the shaft by a rubber bushing. The rubber bushing requires an undercut to receive the needle bearing and lip seals that are difficult to manufacture and limit design options.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a bearing assembly comprising an outer race made of metal and a plurality of rolling elements in rolling contact with the outer race and retained within a bearing cage. An annular bushing partially encloses the outer race, the annular bushing being split along a radial plane into two bushing halves molded of an engineered thermoplastic elastomer. The bushing halves are retained axially together by a retention means such that axial movement of the outer race is limited.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
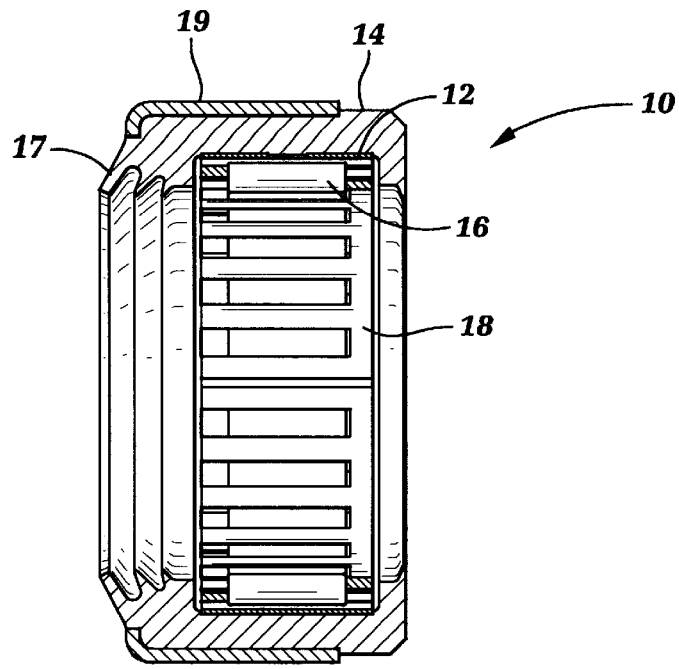
FIG. 1 is a cross sectional view of a zero clearance needle bearing assembly illustrating the prior art.

Referring now to the drawings, FIG. 1 illustrates a zero clearance needle bearing assembly 10 comprising a split outer race 12 within a compression set natural Burma rubber (NBR) bushing 14. Needle rollers 16 retained in a split bearing cage 38 are compressed radially inwardly by the rubber bushing 14 against a shaft, not shown, to provide zero clearance. A lipped seal 17 may be provided to contain grease and exclude contamination, however, due to manufacture and assembly difficulties associated with the lipped seal and pocket for the split outer race 12, design options are severely limited. The bearing assembly 10 may have an insert molded steel sleeve 19 and must be oriented when installed.

Figure 2:
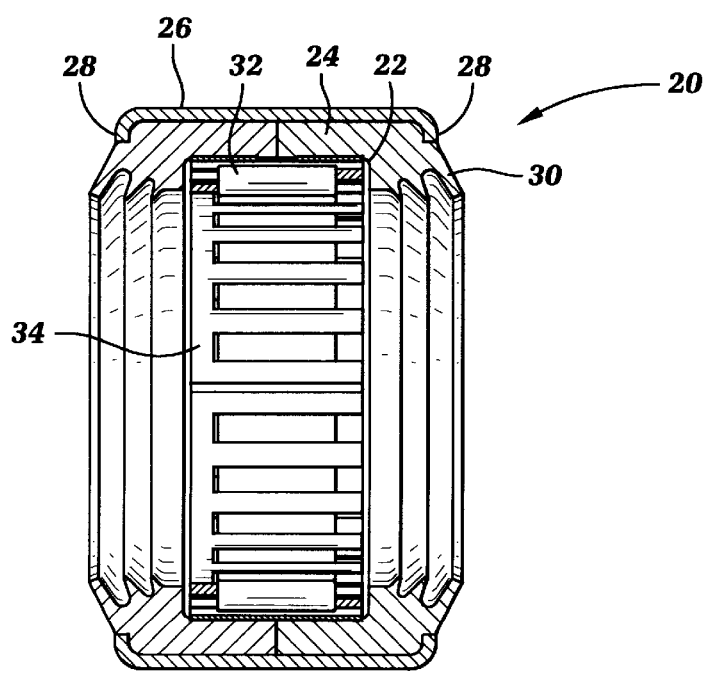
FIG. 2 is a cross sectional view of a zero clearance needle bearing assembly illustrating an embodiment of the present invention.

FIG. 2 illustrates a needle bearing assembly 20 according to one embodiment of the present invention. An outer race 22 is held within an annular bushing that is split along a radial plane into two bushing halves 24. The bushing halves 24 are molded of an engineered thermoplastic elastomer, for example Sarlink, available from DSM Themoplastic Elastomers Incorporated. The bushing halves 24 enclose a radially outward surface of the outer race 22 and wrap around axial ends of the outer race 22. A cylindrical drawn cup 26, or some other retention means, retains the bushing halves 24 together axially such that axial movement of the outer race 22 is limited. Drawn cup 26 may be formed of soft steel with axial ends 28 curled radially inwardly as shown to provide the required axial retention.

Unlike the prior art bearing assembly 10, the bushing halves 24 can be easily injection molded since a large under cut is not required to form a pocket for the outer race. Injection molding reduces the processing cycle time compared to compression set molding and allows a larger selection of materials to be used. The engineered thermoplastic elastomer of the bushing halves 24 allows some self-alignment and dampens noise and vibration. In addition, the material, configuration and molding process allow the bushing halves 24 to incorporate integral annular seals 30 with a wide range of lip designs on both axial ends of the bushing halves 24 to seal against a shaft or inner bearing race, not shown.

If desired, outer race 22 may be split, as illustrated in FIG. 2, to allow the outer race 22 to be biased radially inwardly by the bushing halves 24 to force needle rollers 32 against a shaft or inner race, not shown, to provide a zero clearance bearing. In such variations, bearing cage 34 retaining the needle rollers 32 may be split, also, to facilitate this closing of the bearing assembly onto the shaft or inner race. Significantly, the bushing halves 24 may be identical, thereby simplifying manufacture and assembly, and the drawn cup 26 may be press fit in a housing such that variations in the housing bore are compensated by distortion of the soft material.

Figure 3:
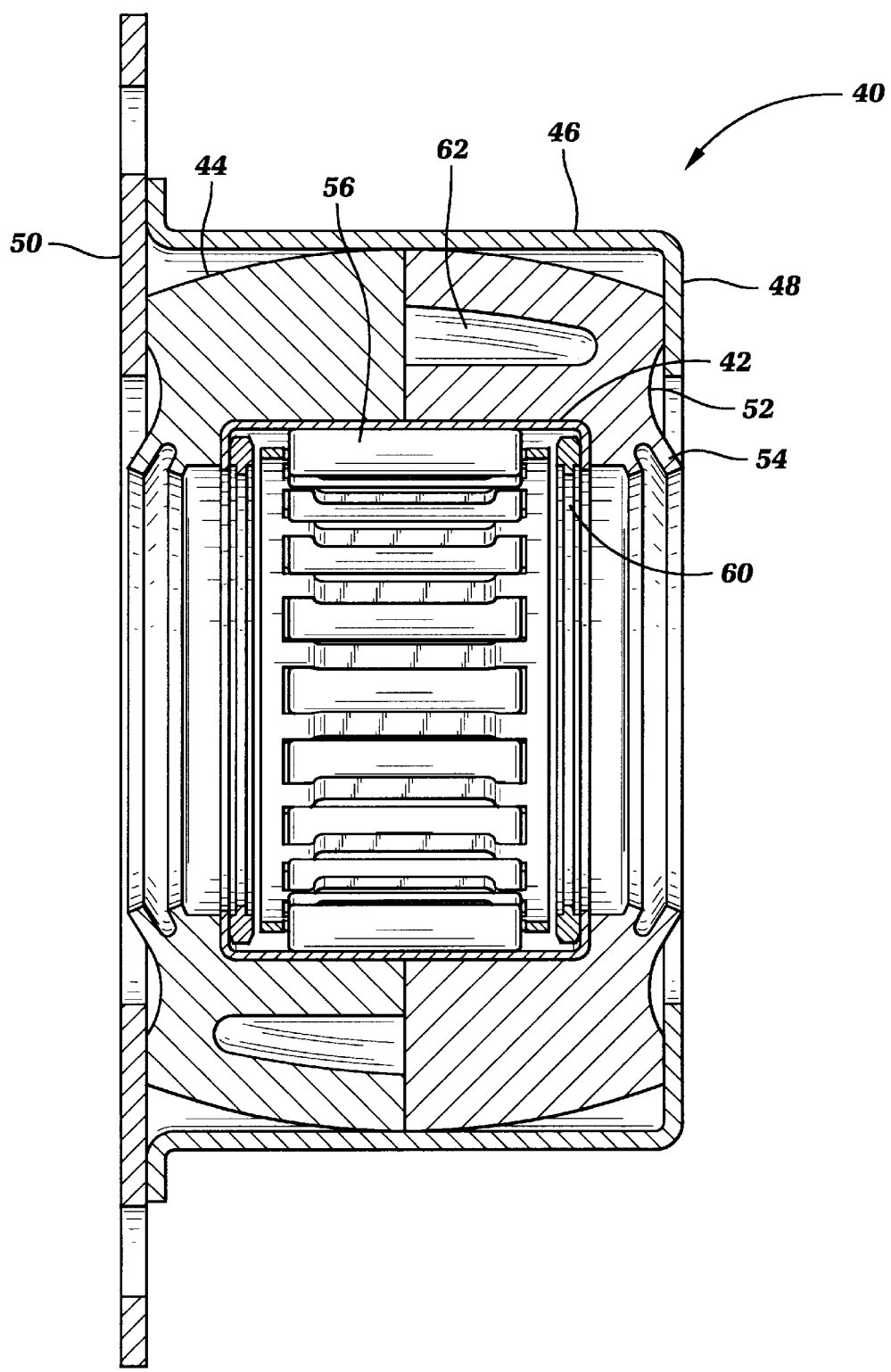
FIG. 3 is a cross sectional view of a self-aligning needle bearing assembly illustrating another embodiment of the present invention.

FIG. 3 illustrates a needle bearing assembly 40 according to another embodiment of the present invention. Outer race 42 is held within an annular bushing that is split along a radial plane into two bushing halves 44 similar to those of the first embodiment. The bushing halves 44 are molded of an engineered thermoplastic elastomer, enclose a radially outward surface of the outer race 42, and wrap around axial ends of the outer race 42. A cup 46, or some other retention means, retains the bushing halves 44 together axially such that axial movement of the outer race 42 is limited. The cup 46 may be cylindrical as shown, or may have some other concave configuration.

Unlike bushing halves 24 of the first embodiment, bushing halves 44 do not have a cylindrical radially outward surface but have radially outward convex surface 48 that is rounded such that self-alignment of the bearing assembly 40 is facilitated. The cup 46 may be formed of one or more separate pieces joined together to provide end walls 48 and 50 that extend radially inwardly such that the bushing halves 44 may pivot with respect to the cup 46 while maintaining axial retention of the outer race 42. The rounded radially outward convex surface 48 of the bushing halves 44 may be spherical or may be barrel shaped, as illustrated, with an arcuate cross section that has a radius greater than that of a spherical shape.

Bushing halves 44 are injection molded with recessed end portions 52 that facilitate self-alignment of the bearing assembly 50 without excessive interference between end walls 48 and 50 and the bushing halves 44. Similar to the first embodiment, bushing halves 44 may incorporated integral lipped seals 54 at their axially outward portions, and needle rollers 56 may be in rolling contact with the outer race 42, the needle rollers 56 being retained in a bearing cage 58. The outer race 42 and bearing cage 58 may be continuous, as illustrated, or split, as illustrated with respect to the first embodiment. An optional ring 60, formed of acetal polymer, for example, may be provided at the axial ends of the bearing cage 58 to form a labyrinth seal.

Figure 4:
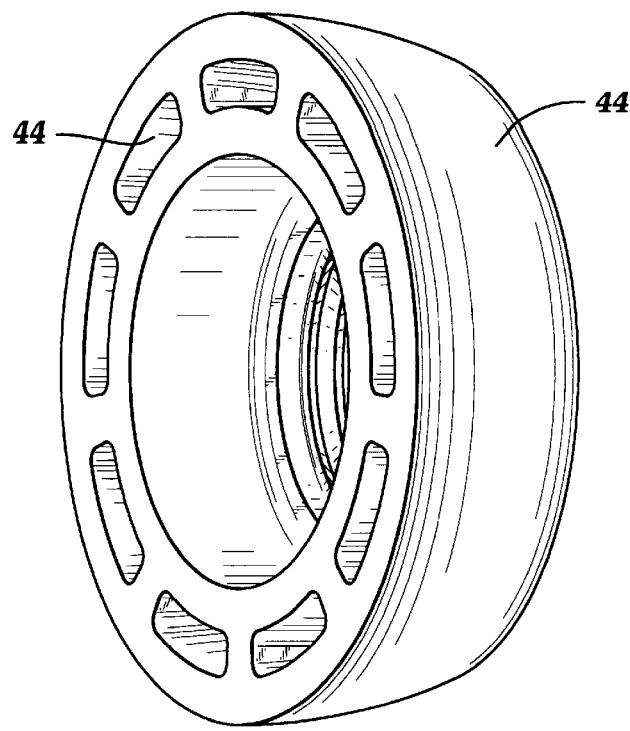
FIG. 4 is a pictorial view of a bushing half of the selfaligning needle bearing assembly of FIG. 3.
Figure 5:
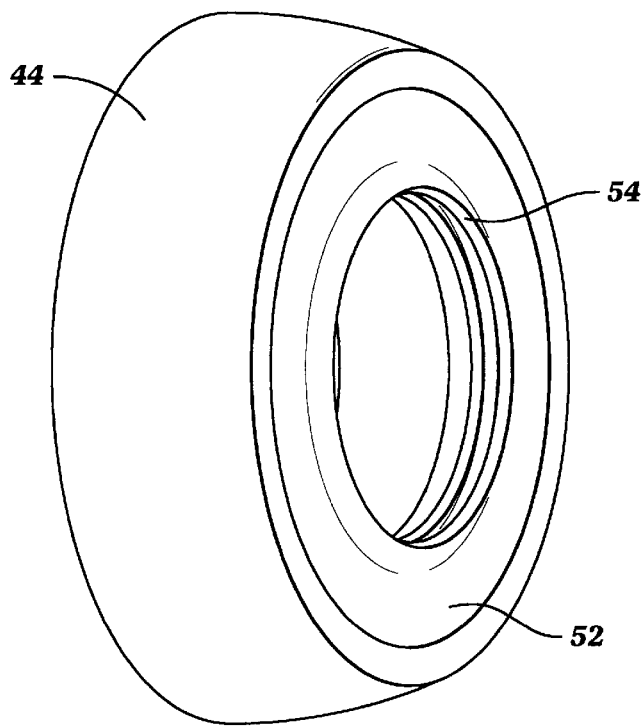
FIG. 5 is another pictorial view of a bushing half of the self-aligning bearing assembly of FIG. 3.

As illustrated in FIGS. 3 and 4, the bushing halves 44 may have a plurality of circumferentially spaced recesses 62. These recesses 62 facilitate injection molding, the cored out areas providing a more uniform thickness of the material. In addition, the resulting web or spoke-like configuration enhances the isolation properties of the annular bushing. The bushing halves 44 may be identical, simplifying production, and may be configured to include a mechanical interlock to facilitate alignment and/or axial retention of the two bushing halves. The concave cup 46 may wrap closely around the rounded radially outward convex surface of the bushing halves 44, and the two surfaces may be spherical rather than barrel shaped.

From the above description, it will be apparent that the present invention provides a bearing assembly that isolates a steering column or other shaft with respect to noise and vibration and provides some self-alignment capability. The invention is suited to needle rollers as well as ball-type rolling elements. The invention allows greater design flexibility, eliminates the need to orient the bearing assembly, simplifies manufacture of the bearing assembly, and facilitates incorporation of integral lipped seals.

Having described the invention, what is claimed is:

1. A bearing assembly comprising:
   an outer race made of metal;
   a plurality of rolling elements in rolling contact with the outer race and retained within a bearing cage;
   an annular bushing partially enclosing the outer race, the annular bushing being split along a radial plane into two bushing halves, the bushing halves being molded of an engineered thermoplastic elastomer; and
   retention means for retaining the bushing halves axially together such that axial movement of the outer race is limited.

2. A bearing assembly according to claim 1, wherein the bushing halves each incorporate integral annular seals.

3. A bearing assembly according to claim 1, wherein the retention means includes a metal cup wrapped around radially outward surfaces of the bushing halves to prevent axially outward movement of the bushing halves.

4. A bearing assembly according to claim 1, wherein the bushing halves have a radially outward surface that is cylindrical.

5. A bearing assembly according to claim 4, wherein the retention means includes a cylindrical drawn cup positioned against the cylindrical radially outward surfaces of the bushing halves, the drawn cup having radially inwardly directed end flanges wrapped around axially outward surfaces of the bushing halves.

6. A bearing assembly according to claim 1, wherein the bushing halves have a radially outward convex surface that is rounded such that self-alignment of the bearing assembly is facilitated.

7. A bearing assembly according to claim 6, wherein the retention means includes a concave metal cup wrapped around a portion of the rounded radially outward convex surface of the bushing halves.

8. A bearing assembly according to claim 6, wherein the rounded radially outward surface of the bushing halves is spherical.

9. A bearing assembly according to claim 6, wherein the rounded radially outward surface of the bushing halves is barrel shaped such that a longitudinal section of the bushing halves has an arcuate outline.

10. A bearing assembly according to claim 1, wherein the retention means includes a mechanical interlock provided by portions of the bushing halves.

11. A bearing assembly according to claim 1, wherein the bushing halves are identical.

12. A bearing assembly according to claim 1, wherein the outer race is split such that a radially inward force applied through the bushing halves allows the outer race to close against a shaft to reduce clearance between the shaft, the rolling elements and the outer race.

* * * * *